United States Patent [19]

Miyata

[11] Patent Number: 5,151,949
[45] Date of Patent: Sep. 29, 1992

[54] SYSTEM AND METHOD EMPLOYING MULTIPLE PREDICTOR SETS TO COMPRESS IMAGE DATA HAVING DIFFERENT PORTIONS

[75] Inventor: Masahiko Miyata, Kanagawa, Japan
[73] Assignee: Fuji Xerox Co., Ltd., Tokyo, Japan
[21] Appl. No.: 594,130
[22] Filed: Oct. 10, 1990
[51] Int. Cl.⁵ .............................................. G06K 9/00
[52] U.S. Cl. .......................................... 382/9; 382/56
[58] Field of Search .............................. 358/425-426, 358/261.1-261.2; 382/9-10, 48-49, 56

[56] References Cited

U.S. PATENT DOCUMENTS

| | | | |
|---|---|---|---|
| 4,513,442 | 4/1985 | Scherl | 382/9 |
| 4,528,692 | 7/1985 | Umeda et al. | 382/9 |
| 5,038,390 | 8/1991 | Ravi Chandran | 382/56 |

Primary Examiner—Stephen Brinich
Attorney, Agent, or Firm—Finnegan, Henderson, Farabow, Garrett and Dunner

[57] ABSTRACT

An image processing system for selecting a set of predictors based on characteristics of the data to be compressed. The image processing system includes a predictor stage, having a multiple predictors, in which input image data is conditioned by a predictor as selected from among a set of predictors according to the number of prediction errors. The set of predictors is selected according to a bit pattern of the input image data. The conditioned data is compressed and transmitted to a decompressor where it is decompressed, depredicted, and output in the form of an image. The data compressing system includes circuitry for determining whether input image data is gradation data or text image data, circuitry for applying a boundary code to the image data when the determining means detects a change point where the image data is changed from the text image to the gradation data or from the gradation data to the text data, and a compressor including boundary code detecting circuitry and two predictor sets respectively for the gradation image data and the text image data after detecting a boundary code, the compressor selects the predictor set most suitable for the input image data.

8 Claims, 6 Drawing Sheets

FIG. 2
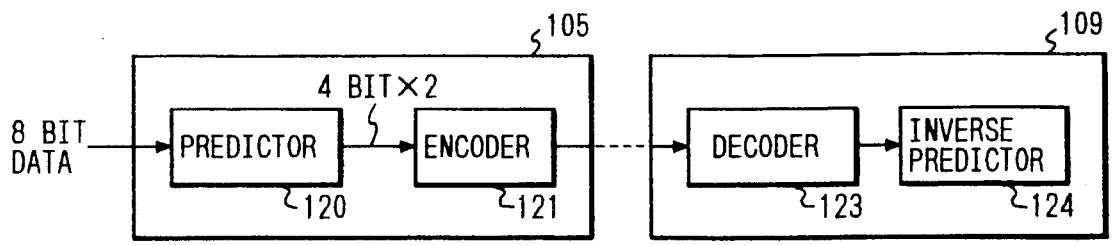
FIG. 3(a)
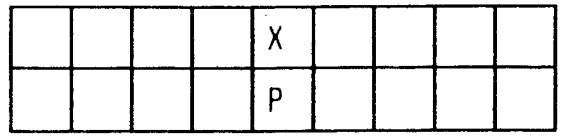
FIG. 3(b)
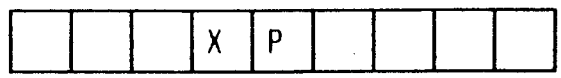
FIG. 3(c)
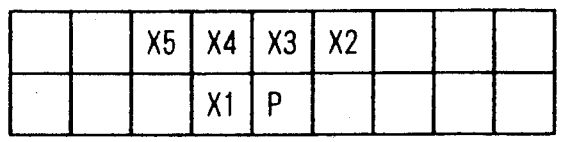
FIG. 3(d)
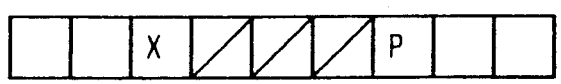
FIG. 4
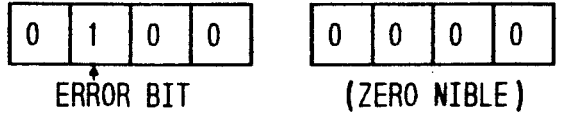

FIG. 5

| TA | 0001, 0010, 0100, 1000 |
|---|---|
| TB | ERROR DATA OF 4 BITS THAT ARE OTHER THAN TA AND THE ZERO NIBLE |

| aa | tttt |
|---|---|
| 00 | 1000 |
| 01 | 0100 |
| 10 | 0010 |
| 11 | 0001 |

| bbbb | tttt |
|---|---|
| 0100 | 0011 |
| 0101 | 0101 |
| 0110 | 0110 |
| 0111 | 0111 |
| 1001 | 1001 |
| 1010 | 1010 |
| 1011 | 1011 |
| 1100 | 1100 |
| 1101 | 1101 |
| 1110 | 1110 |
| 1111 | 1111 |

FIG. 7

| 0 | 10aa |
|---|---|
| 1~25 | 0rrrrraa |
| 26~63 | 11rrrrrrtttt |
| 64~89 | 11ssssssstttt |

| 0, 1 | 011bbbbr |
|---|---|
| 2~63 | 11rrrrtttt |

FIG. 9  11rrrrrr0000

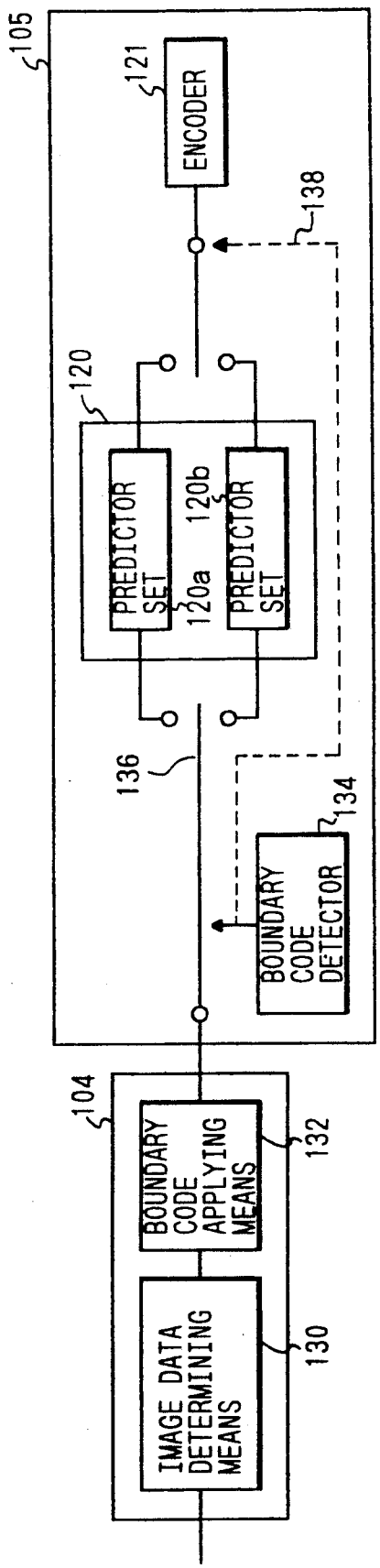

SYSTEM AND METHOD EMPLOYING MULTIPLE PREDICTOR SETS TO COMPRESS IMAGE DATA HAVING DIFFERENT PORTIONS

BACKGROUND OF THE INVENTION

1. Field of the Invention

This invention relates to a data compressing system, and more particularly to a data compression system for an image processing system employing multiple predictors.

2. Discussion of the Related Art

In an image processing system it is typically desirable to compress image data. If the image data is being stored, compression of the data conserves the amount of storage space used. If the image data is being transferred over a communication line, compression of the data reduces bandwidth requirements or reduces transmission time.

Many compressors employ a run-length encoder that encodes sections of the input data containing a run of zeros into a number indicating the number of zeros successively appearing in the input data. Another type of encoder uses a two dimensional encoding system that encodes based on a correlation in the vertical as well as the horizontal direction.

One or two dimensional encoding is suitable for image data because image data tends to have similar types of data grouped together within a given area of the image. Before processing image data with a run-length encoder, however, it is desirable to precondition the data to increase the number of successive zeros with a "predictor." A predictor predicts the value of the next pixel on the basis of values of pixels already processed.

A typical predictor unit contains multiple predictors. Each predictor is applied to a current pixel, and the predictor generating the least amount of error is used to predict that particular pixel. Multiple predictors are used because the predictor generating the least amount of area will be a function of the type of data in the particular portion of the image being processed. Some predictors are suitable for halftone image data such as that obtained from a television signal.

There is a trade off between prediction error and the amount of processing needed to make a particular prediction. To reduce the average amount of prediction error, it is desirable to have a large number of predictors available to the prediction unit so that it is likely that a predictor will be present to be suitable for the particular type of data being processed. Having a large number of predictors means that a correspondingly large number of trial predictions must be made to predict a particularly pixel. Having a large number of trial predictions means either that the time needed to predict a particular pixel is large as each trial is conducted in succession, or that a correspondingly large number of processing elements is required to conduct concurrently.

Conversely, reducing the number of available predictors increases the amount of prediction error making it more difficult to attain high redundancy reduction efficiency.

SUMMARY OF THE INVENTION

It is an object of the present invention to optimize the trade off between prediction error and prediction processing.

It is an additional object of the present invention to provide an image data processing system having less prediction error and providing a high redundancy reduction efficiency, without the usual penalty of additional prediction time.

Additional advantages of the invention will be set forth in part in the description which follows and in part will be obvious from the description, or may be learned by practice of the invention.

Briefly, this invention selects one set of predictors from multiple sets of predictors based on characteristics of the input image data. A trial prediction is conducted for each predictor in the selected set, instead of for every available predictor. Thus, processing is reduced.

To achieve these and other advantages according to one aspect of the invention a method of predicting a series of input pixels comprising the steps, executed by a processor, of determining, in accordance with the bit pattern of a current pixel, whether the current pixel is a first type or a second type; detecting, in response to the determining steps, whether the current pixel type is different than the pixel type of a preceding pixel; inserting, in response to the detecting step, a boundary code into the pixel series before the current pixel if the pixel type of the current pixel is different than the pixel type of the immediately preceding pixel; selecting one set of predictors from a plurality of sets of predictors including the substep of detecting a boundary code; predicting the previous pixel with multiple predictors in the selected set of predictors; selecting one of the predictors in the selected set of predictors in accordance with the number of error bits generated by predicting the previous pixel.

To achieve these and other advantages according to another aspect of the invention an image data processing system for processing input image data arranged in a series of portions, each portion including either gradation type image data or text type image data, comprises means for detecting a boundary where a portion of the input image data is of a different type than a preceding portion of input image data in accordance with a bit pattern of the portion of input image data; means, coupled to the detecting means, for inserting a boundary code into the image data when said detecting means detects a boundary; and predicting means, coupled to the inserting means, for predicting data in a plurality of portions in the series of portions. The predicting means includes means for detecting the boundary code; a first predictor set containing predictors suitable for predicting gradation image data; a second predictor set containing predictors suitable for predicting text image data; predictor set selecting means, responsive to the boundary code detecting means, for selecting either the first predictor set or the second predictor set.

The accompanying drawings, which are incorporated in and constitute a part of this specification illustrate one embodiment of the invention and, together with the description, serve to explain the advantages and principles of the invention.

BRIEF DESCRIPTION OF THE DRAWINGS

FIG. 2 is a block diagram showing a compressor unit and a decompressor unit that are used in the image processing system shown in FIG. 1.

FIGS. 3(a) through 3(d) are diagrams for explaining various type of predictors.

FIG. 4 is a diagram for explaining error data generated by a predictor.

FIG. 5 is a diagram showing terminator codes for delineating runs of zeros.

FIGS. 6(a) through 6(b) are diagrams for explaining the selection of a terminator code.

FIGS. 7 to 9 are diagrams for explaining the coding of runs of various lengths.

FIGS. 10(a) and 10(b) are diagrams illustrating the encoding of a bit series generated by the prediction unit.

FIGS. 11(a) to 11(c) are diagrams for explaining the structure of image data.

FIG. 12 is a block diagram for explaining the data compressing system according to the preferred embodiment of the present invention.

DETAILED DESCRIPTION OF THE PREFERRED EMBODIMENTS

An embodiment of a data compressing method for an image processing system will be described with reference to the accompanying drawings.

Figure 1:
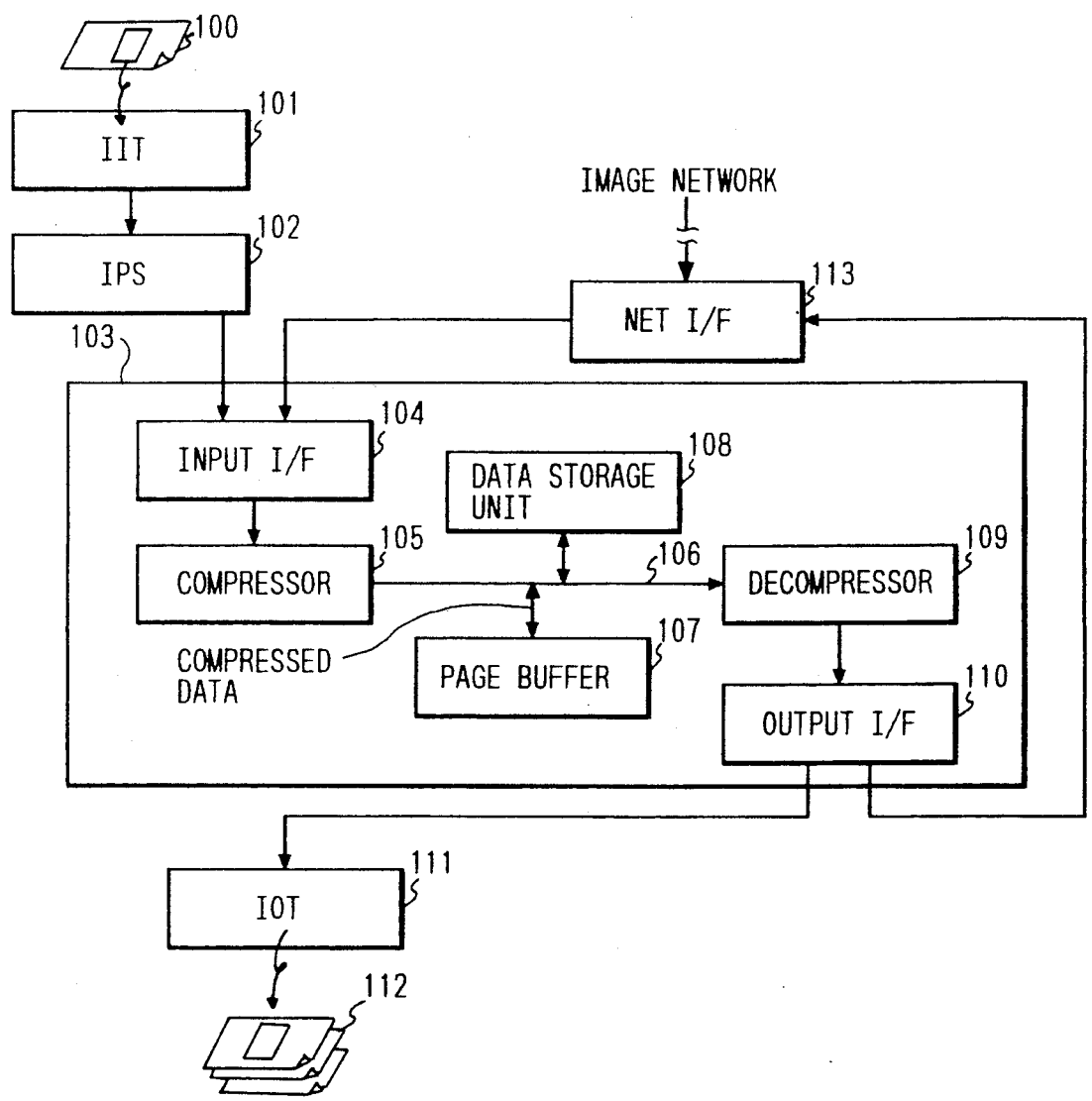
FIG. 1 is a block diagram showing an image processing system in which a data compressing method according the preferred embodiment of the present invention is applied.

FIG. 1 is a block diagram showing an image processing system in which a data compressing method according to the present invention is applied. FIG. 1 shows a document 100, an image input terminal (IIT) 101, an image data processing unit (IPS) 102, a compandor (compressor/expandor) section 103, an input interface (I/F) 104, a data compressor unit 105, a transmission line 106, a page buffer 107, an image data storage unit 108, an expander or decompressor unit 109, an output interface (I/F) 110, an image output terminal (IOT) 111, a copy/print output unit 112, and a network interface (I/F) 113.

Image data obtained by scanning the surface of document 100 by IIT 101 is processed by the IPS 102, and is transferred to compandor unit 103, through input I/F 104. Image data generated by I/F 104 is compressed by compressor unit 105, as will be described in detail later. Each page of the compressed data is either stored into page buffer 107 or is directly transferred to decompressor unit 109 where it is decompressed. The decompressed image data is transferred through output I/F 110 to IOT 111. The image data is also transferred to an image network, through output I/F 110 and network I/F 113. The image processing system is capable of receiving image data from the image network for compression, decompression, and reproduction. Further, the image data as compressed by compressor unit 105 is stored into image data storage unit 108 and may be output at a later time.

FIG. 2 shows compressor unit 105 in series with decompressor unit 109. In compressor unit 105, input data is first processed by predictor 120. The output of predictor 120 will tend to have longer runs of zero than the input of predictor unit 120.

Predictor unit 120 consists of 2 sets of predictors, a first set in 120b suitable for text image data and a second set in 120a suitable for gradation image data. The first set of predictors suitable for text image data contains 3 predictors of 3 different types. The first type of the predictor is a bit-above predictor shown in FIG. 3(a). The bit-above predictor predicts a value of a bit P by referring to a value of a bit X located at the corresponding horizontal position in the previous line.

The second type of the predictor is a pre-bit predictor shown in FIG. 3(b). The pre-bit predictor predicts a value of a pixel P by referring to a value of a bit X immediately preceding bit P.

The third type of the predictor is a font (five elements) predictor shown in FIG. 3(c). The font predictor predicts a value of a bit P on the basis of the statistical result of states of five reference pixels X1, X2, X3, X4 and X5.

The second set of predictors is suitable for gradation halftone image data and contains 12 halftone predictors. Each of the 12 halftone predictors uses a reference pixel preceding predictive bit P by 5 to 16 bits respectively, as generally shown in FIG. 3(d).

In order to implement each of the predictors described above, predictor unit 120 contains a memory to enable it to refer to the 16 pixels preceding the predictive pixel, and to the pixels of the previous line.

The prediction process adapts to changes in the input data. The adaptive prediction process operates as follows. For the selection of one of the predictors in the first set, a predictor priority order is initialized at the beginning of each line. The priority order at the beginning of a line is as follows:

(1) 5 element predictor
(2) bit-above predictor
(3) pre-bit predictor

After priority order initialization, the predictors are selected in the following way. If the previous 8-bit data was predicted with no error, the predictor used to predict the previous 8-bit data is used for the current 8-bit data. If the predictor used for the previous 8-bit data produced an error, the predictor that produces the least amount of error for the previous pixel is selected among from the predictors in the priority order of (1) to (3). In case where the predictor previously used produces an error and the other predictors are successively selected and used in the priority order and each produces an error equal to that of the previously used predictor, the previously used predictor is used for the current 8-bit data.

Predictor unit 120 receives 8-bit data, and produces error data every four bits.

FIG. 4 is a diagram for explaining error data generated by predictor unit 120. As shown, the predictor unit 120 sequentially receives 8-bit data. Then, in the predictor unit, a predictor is selected in accordance with the rules described earlier. Predictor unit 120 produces error data every four bits (nibble). When an error is 0, the error data is a zero nibble (0000). When an error occurs, the bit of the error is set to "1", and the error data might be (0100), for example.

Encoder 121 encodes the data generated by predictor unit 120. The data generated by predictor 120 will consist of runs of zero nibbles interspersed with nonzero nibbles. Encoder 121 encodes the runs of zero nibbles with a run-length and a terminator code. A terminator code is selected based on the bit pattern of the first nonzero nibble after a run of zero nibbles. In other words, terminator codes are selected depending o the types of the error data.

FIG. 5 is a chart associating types of error data with a terminator code. In the case of the error data containing a single error bit, such as 0001, 0010, 0100, and 1000, the terminator code is TA. In the case of error data containing multiple error bits, the terminator code is TB.

For the terminator code TA, the error data is encoded tttt→aa; 0001→00, 0010→01, 0100→10, and 1000→11 (see FIG. 6(a)).

FIG. 6(b) shows that in the case of the terminator code TB, the error data is encoded rrrr→bb; 0011→0100, 0101→0101, 0110→0110, 0111→0111, 1001→1001, 1010→1010, 1011→1011, 1100→110, 1101→1101, 1110→1110, and 1111→1111 (see FIG. 6(b)).

FIG. 7 shows the encoding of a run of the zero nibbles in accordance with the run-length and the terminator codes case by case. Consider a case where a run-length of zero is delineated by error data containing a single error bit (terminator code TA). In this case, the run-length of 0 is expressed by 10aa. Run-lengths of 1 to 25 are designated by 0rrr rraa, 26 to 63 by 11rr rrr ttt, and 64 to 89 by 11ss ssss tttt. The codes rrrrr and rrrrrr denote a binary expression of the run-length. The code ssssss denotes a binary expression of the result of subtraction of 64 from the run-length.

In the case of the terminator code TB for the error data containing a plurality of error bits, the run-length of 0 or 1 is expressed by 011b bbbr. The run-lengths of 2 to 63, by 11rr rrrr tttt. Here, tttt is encoded by bbbb shown in FIG. 6.

Figures 8, 11A:
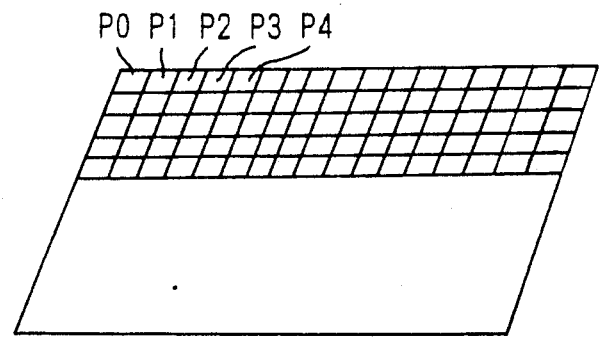

Run-lengths too long to be encoded by the scheme shown in FIGS. 7 and 8 are encoded in the form of a multiple of 64 number of 0 nibbles. FIG. 9 shows the encoding of long run-lengths as 11rr rrrr 0000 where rrrrrr is a binary value obtained by dividing the run-length by 64. Run-lengths that are multiples of 64 in the range 64 to 4032 are encoded in this manner.

FIG. 10 shows an example of the processing of encoder 121. FIG. 10(a) is a series of bits applied to encoder 121 and FIG. 10(b) is the encoded version of the bit series of FIG. 10(a) generated by encoder 121.

In FIG. 10(b), "0000 0001" on the first line indicates a normal mode in which input data is predicted and then encoded. "0000 0001" is used for distinguishing the case of no prediction and no coding. The second line encodes the 8 nibbles of successive "0"s from the beginning up to non-zero nibble containing "0001". The terminator code is TA, because the non-zero nibble contains a single error bit. Because the run-length is 8, this case corresponds to the second line of the table in FIG. 7, covering run-lengths between 1 and 25. Thus, "0" is the first digit of the code. Next, the run-length of 8 is expressed by "1000" followed by the terminator "0001", because the code is 11 in the column of "aa" (see FIG. 6(a)). As a result, an 8-bit binary code of "0010 0011" of the second line is formed.

The third line represents the run-length of the bit series from the second half of the fifth byte delineated by the 1111 in the first half of the sixth byte. Because the terminator is 1111 (TB), this case corresponds to the second line of the table of FIG. 8 where the run-length is 0-1, and "011" will appear in the code. "bbbb" representative of the terminator corresponds to "1111", and hence is "1111" (see FIG. 6(b)). Finally, "1" representative of the run-length appears in the code. Consequently, a code "0111 1111" is formed. The fourth line represents the start of the next line of encoded input image data.

The error data encoded by encoder 121 is transferred through a transmission line to a decoder 123 where it is decoded. An inverse predictor 124 converts the decoded error data to the image data in accordance with the predictor used.

No special code is inserted in the compressed data to indicate which predictor was applied by predictor unit 120. Inverse predictor 124 can determine the predictor used by predictor unit 120 because inverse predictor 124 contains the same predictor selection rules as predictor 120, and because the predictor selected for the current pixel is based on the predictor that would have worked best on the previous pixel. Thus, inverse predictor 124 has the same information available for selecting a predictor as predictor unit 120.

The processing of predictor 120 will now be described. In the description it is assumed that raster data is serially input to compandor 103.

In the present invention, input I/F 104 shown in FIG. 1, which serially receives raster data from IPS 102, contains a line memory for storing the image data, and determines whether the serial data is text image data or gradation image data.

If the image data P0, P1, P2, P3, P4, . . . as collected by scanning the surface of a document as shown in FIG. 11(a), is text data, "0's" of white data or "1's" of black data successively appear as shown in FIG. 11(b). If the image data is gradation image data bit patterns other than successive "0's" or "1's" appear as shown in FIG. 11(c).

Input I/F 102 contains a determining means 130, as shown in FIG. 12 for determining that the image data having the bit pattern as shown in FIG. 11(b) is text data, and that image data having the bit pattern as shown in FIG. 11(c) is gradation data. In the description to follow, the image data has the data structure of 4 bits/pixel.

Figure 13:
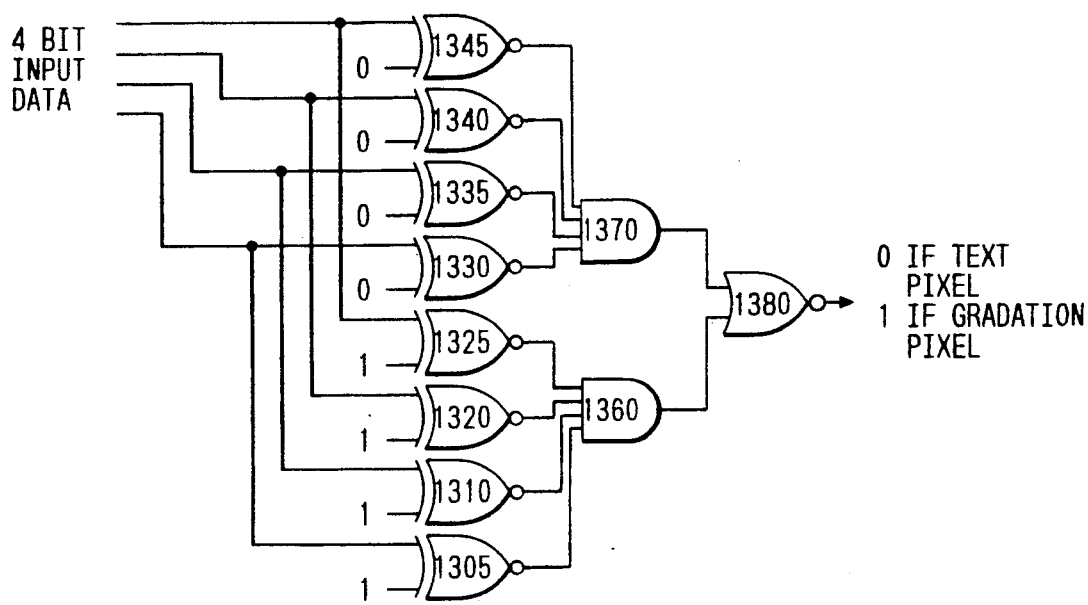
FIG. 13 is a block diagram showing a determining circuit for determining whether the image data is text image data or gradation image data.

FIG. 13 is a diagram of some circuitry in the determining means. To determine whether the 4 bit input pixel contains all 1's, the 4 bits of the input pixel are applied to exclusive NOR gates 1305-1325 respectively. An exclusive NOR gate generates a 1 output when its two applied input values are equal. AND gate 1360 will generate a 1 when the outputs of exclusive NOR gates 1305-1325 are all 1, thereby causing NOR gate 1380 to generate a 0 to indicate that the pixel is a text pixel. Similar processing occurs for exclusive NOR gates 1330-1345 and AND gate 1370 to determine whether the pixel contains all 0's, thereby causing exclusive NOR gate 1380 to output a 0 to indicate that the pixel is a pixel of text data. Exclusive NOR gate 1380 generates an output of 1 when the input pixel is gradation image data.

When the type of the pixel is determined as described above, and the type is different from the type of the previous pixel, a boundary code is inserted to flag the boundary of the text data and the gradation data.

Figure 14:
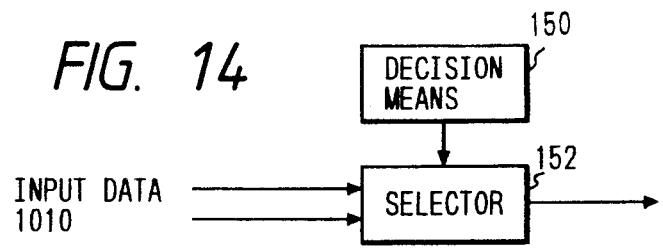
FIG. 14 is a block diagram showing the insertion of boundary data into the image data.

FIG. 14 shows a boundary data inserting means 132. With the pixels determined to be either text data or gradation data, at a boundary where the image data changes from text to gradation, or from gradation to text, a boundary code is inserted into the image data. When the data compressor detects a boundary code, it selects the predictor set suitable for text image data or the predictor set suitable for gradation image. As a consequence, the data compressing system suffers less prediction error, providing a high redundancy reduction efficiency, without the usual increase in the amount of processing needed to select a predictor for each pixel.

A decision means 150, coupled with the output of NOR gate 1380 shown in FIG. 13, detects a point where the output data of NOR gate 1380 makes a transition from "0" to "1" or "1" to "0". When decision means 150 detects such a transition, decision means 150 applies a signal to the control input of selector 152 causing selector 152 to select the boundary code data instead of data from the pixel bit series. In the preferred embodiment the boundary code is "1010", which is a bit pattern that will not appear in a pixel of image data. In general, the boundary code may be any code that does not appear in pixel image data.

Compressor 105 contains a boundary code detector 134 and a prediction set selector 136. When boundary code detector 134 detects a boundary code, prediction set selector 136 switches from one predictor set to the other thereby selecting the predictor set most suitable for the input image data. When decision means 150 does not detect a transition of the output data of NOR gate 1380 selector 152 decision means 150 applies a control input causing selector 152 to select data from the pixel bit series.

Figure 15A:
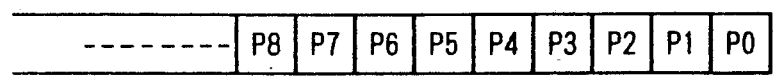
FIGS. 15(a) and 15(b) are diagrams of image data containing inserted boundary codes.
Figure 15B:
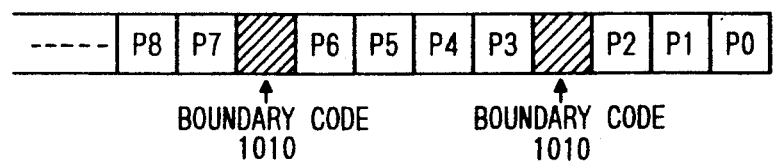

Accordingly, when the image data P0, P1, P2, P3, P4, P5, . . . as shown in FIG. 15(a) is received, the image data with inserted boundary codes is output to compressor 105 as shown in FIG. 15(b).

Predictor set selection and predictor selection within the selected predictor set in decompressor 109 is similar to the processing of compressor 105. Decompressor 109 will always be depredicting with the predictor used by compressor 105 because decompressor 109 follows the same selection rules as compressor 105.

With the compression system according to the preferred embodiment of the present invention compression efficiency is enhanced by the selection of an appropriate predictor without the usual increase in processing associated with selecting the correct predictor. Thus, image data containing both text image data and halftone image data is efficiently compressed.

Although in the above-mentioned embodiment of the present invention, the data of 4 bits/pixel is used, any number of bits per pixel may be used.

With the method of predicting a series of input pixels according to the preferred embodiment of the present invention, predictors unsuitable for the current type of image data tend to be not considered in the prediction selection process, while predictors suitable for the current type of image data tend to be considered in the prediction selection process. Thus, more predictors can be added to the total set of predictors without the usual increase in processing required for predictor selection thereby reducing the average prediction error. Prediction immediately after a boundary will have the most noticeable reduction in prediction error.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. A processor-implemented method of predicting a series of input pixels comprising the steps of:

determining, in accordance with a bit pattern of a current pixel, whether the current pixel is a first type or a second type;

detecting, in response to the determining step, whether the current pixel type is different than the pixel type of a preceding pixel;

inserting, in response to the detecting step, a boundary code into the pixel series before the current pixel if the pixel type of the current pixel is different than the pixel type of the preceding pixel;

selecting one set of predictors from a plurality of sets of predictors including the substep of detecting a boundary code;

processing the previous pixel with multiple predictors in the selected set of predictors; and selecting one of the predictors in the selected set of predictors in accordance with a number of error bits generated by processing the previous pixel.

2. The method according to claim 1, wherein the boundary code inserting step includes the substep of selecting, in response to the detecting step, either the input image data or the boundary code.

3. The method according to claim 1, further including the step of predicting the current pixel in accordance with the predictor selected in the selecting step.

4. The method according to claim 1, wherein the step of determining includes the substep of determining the pixel to be the first type when the pixel bits have a common value.

5. An image data processing system for processing input image data arranged in a series of portions, each portion including either gradation type image data or text type image data, comprising:

means for detecting a boundary where a portion of the input image data is of a different type than a preceding portion of input image data in accordance with a bit pattern of the portion of input image data;

means, coupled to the detecting means, for inserting a boundary code into the image data when said detecting means detects a boundary; and predicting means, coupled to the inserting means, for predicting data in a plurality of portions in the series of portions including means for detecting the boundary code;

a first predictor set containing predictors suitable for predicting gradation image data;

a second predictor set containing predictors suitable for predicting text image data;

predictor set selecting means, responsive to the boundary code detecting means, for selecting either the first predictor set or the second predictor set.

6. The system according to claim 5, wherein the boundary code inserting means includes selecting means, having a control input coupled to the detecting means, for selecting either the input image data or the boundary code.

7. The system according to claim 5, wherein the predicting means further includes predictor selecting means, coupled to the predictor set selecting means, for predicting data in a portion in accordance with one of the predictors in a predictor set selected by the predictor set selecting means.

8. The system according to claim 5, wherein the means for determining includes means for determining the portion of image data to be the text type when the pixel bits have a common value.

* * * * *